(12) United States Patent
Shastry

(10) Patent No.: US 12,544,347 B2
(45) Date of Patent: Feb. 10, 2026

(54) ANTI-CANCER COMBINATION AND A METHOD OF THERAPY USING THE COMBINATION

(71) Applicant: NATIONAL CENTRE FOR CELL SCIENCE, Maharashtra (IN)

(72) Inventor: Padma Shastry, Maharashtra (IN)

(73) Assignee: NATIONAL CENTRE FOR CELL SCIENCE, Maharashtra (IN)

(*) Notice: Subject to any disclaimer, the term of this patent is extended or adjusted under 35 U.S.C. 154(b) by 720 days.

(21) Appl. No.: 17/273,642

(22) PCT Filed: Sep. 5, 2019

(86) PCT No.: PCT/IN2019/050637
§ 371 (c)(1),
(2) Date: Mar. 4, 2021

(87) PCT Pub. No.: WO2020/049591
PCT Pub. Date: Mar. 12, 2020

(65) Prior Publication Data
US 2021/0338611 A1   Nov. 4, 2021

(30) Foreign Application Priority Data
Sep. 5, 2018 (IN) .............................. 201821033349

(51) Int. Cl.
| | |
|---|---|
| *A61K 31/19* | (2006.01) |
| *A61K 31/138* | (2006.01) |
| *A61K 31/167* | (2006.01) |
| *A61K 31/4535* | (2006.01) |
| *A61K 31/565* | (2006.01) |
| *A61K 38/15* | (2006.01) |
| *A61P 35/00* | (2006.01) |

(52) U.S. Cl.
CPC ............ *A61K 31/19* (2013.01); *A61K 31/138* (2013.01); *A61K 31/167* (2013.01); *A61K 31/4535* (2013.01); *A61K 31/565* (2013.01); *A61K 38/15* (2013.01); *A61P 35/00* (2018.01)

(58) Field of Classification Search
CPC .... A61K 31/19; A61K 31/138; A61K 31/167; A61K 31/4535; A61K 31/565; A61K 38/15; A61K 31/16; A61K 45/06; A61P 35/00
See application file for complete search history.

(56) References Cited

U.S. PATENT DOCUMENTS

| | | | |
|---|---|---|---|
| 2007/0043120 A1* | 2/2007 | Beyreuther | .......... A61K 31/165 514/616 |
| 2008/0085874 A1* | 4/2008 | Kushner | ................ A61K 31/41 514/648 |
| 2008/0242648 A1* | 10/2008 | Ordentlich | .............. A61P 35/00 514/357 |
| 2009/0048156 A1 | 2/2009 | Brodie et al. | |

FOREIGN PATENT DOCUMENTS

| | | | | |
|---|---|---|---|---|
| EP | 2 099 443 A1 | 9/2009 | | |
| WO | 2008/058287 A1 | 5/2008 | | |
| WO | WO-2009142968 A2 * | 11/2009 | ........... | A61K 31/138 |
| WO | 2013/086379 A2 | 6/2013 | | |

OTHER PUBLICATIONS

Osuka et al. Neurol Med Chir (Tokyo) 52, 186-193, 2012 (Year: 2012).*
Mawatari et al. "Valproic aid inhibits proliferation of HER2-expressing breast cancer cells by inducing cell cycle arrest and apoptosis through Hsp70 acetylation" International Journal of Oncology, 2015, 47, 2073-2081. (Year: 2015).*
Fontaine et al. "Tamoxifen Elicits Atheroprotection through Estrogen Receptor α AF-1 But Does Not Accelerate Reendothelialization" The American Journal of Pathology 2013, 183, 304-312 (Year: 2013).*
Fu et al. "Autophagy induced by valproic acid is associated with oxidative stress in glioma cell lines" Neuro-Oncology 2010, 12(4), 328-340 (Year: 2010).*
Zhang et al. "Tamoxifen-induced Enhancement of Calcium Signaling in Glioma and MCF-7 Breast Cancer Cells" Cancer Research 2000, 60, 5395-5400 (Year: 2000).*
Yarmohamadi et al. "Valproic Acid, a Histone Deacetylase Inhibitor, Enhances Radiosensitivity in Breast Cancer Cell Line" Journal of Radiation and Cancer Research, 2018, 9, 86-92 (Year: 2018).*
Indian Patent Office, International Search Report in International Application No. PCT/IN2019/050637 (Nov. 19, 2019).
Indian Patent Office, Written Opinion in International Application No. PCT/IN2019/050637 (Nov. 19, 2019).
International Bureau of WIPO, International Preliminary Report on Patentability in International Application No. PCT/IN2019/050637 (Mar. 9, 2021).

* cited by examiner

*Primary Examiner* — Bethany P Barham
*Assistant Examiner* — Judith Marie Kamm
(74) *Attorney, Agent, or Firm* — Leydig, Voit & Mayer, Ltd.

(57) ABSTRACT

The present invention pertains to a synergistic combination comprising histone deacetylase inhibitors (HDACi) in combination with estrogen receptor (ER) antagonist for treating gliomas. The present invention also discloses composition containing the combination, and a method of use of the combination and the composition of the present invention and method of treatment using the combination.

7 Claims, 5 Drawing Sheets

VPM, an analogue of VPA sensitizes TAM-induced cell death in ML in LN-18 cells.

TAM-Tamoxifen (10ug/ml) VPA- valproic acid (2mM), VPM(2mM)
% viability calculated considering viability in untreated cells as 100%. * p<0.05

Fig. 4
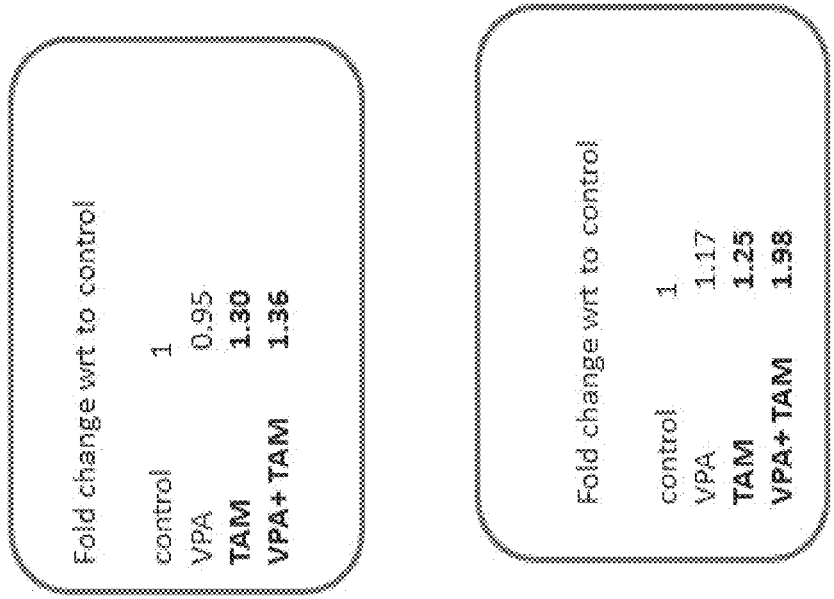
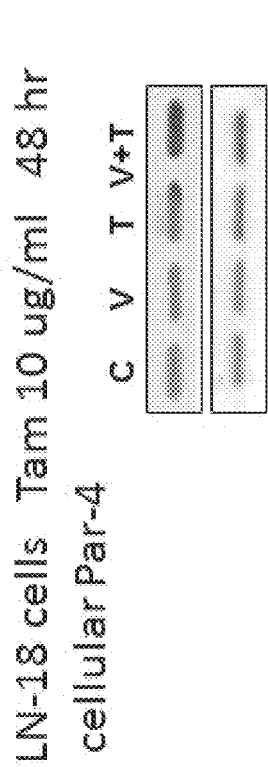
LN-18 cells Tam 10 ug/ml 48 hr
cellular Par-4
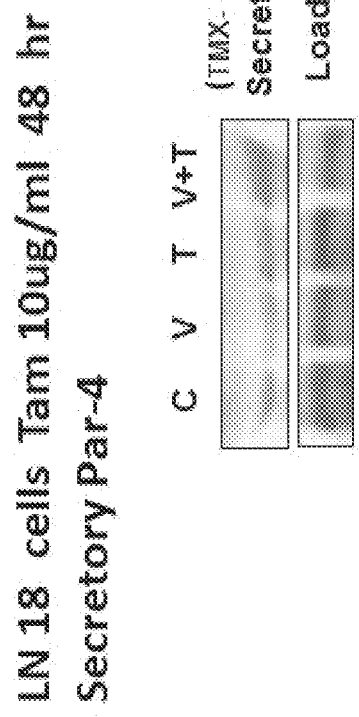
LN 18 cells Tam 10ug/ml 48 hr
Secretory Par-4

ANTI-CANCER COMBINATION AND A METHOD OF THERAPY USING THE COMBINATION

CROSS-REFERENCE TO RELATED APPLICATIONS

This patent application is the U.S. national phase of International Application No. PCT/IN2019/050637, filed on Sep. 5, 2019, which claims the benefit of Indian patent application Ser. No. 201821033349, filed Sep. 5, 2018, the disclosures of which are incorporated herein by reference in their entireties for all purposes.

FIELD OF THE INVENTION

The present invention relates to the field of pharmaceuticals. More specifically, the invention pertains to a novel combination for cancer therapy a method of therapy.

BACKGROUND OF THE INVENTION

Cancer is an abnormal growth of cells and there are several types of cancer, including breast cancer, skin cancer, lung cancer, colon cancer, prostate cancer, brain cancer and lymphoma. Brain tumors are abnormal growth of cells in the brain. High grade gliomas (HGG) or malignant glioma is a deadly form of human cancer. 'Cancer stem cells' (CSC) within solid tumors that compel tumor formation and growth are reported to confer resistance to conventional chemotherapy and radiotherapy. The prognosis for patients with high-grade gliomas (GBM-glioblastomas) is generally poor (in patients with IDH mutations which is a feature in younger patients, the survival is poor). Despite combined modality treatment including surgical resection and radiation, a minority of patients live beyond 2 years. However, various chemotherapeutic agents used as combination therapy targeting multiple pathways are becoming a fast growing area of research.

Selective estrogen receptor modulators (SERM) used as anti-tumoral agents include raloxifene, tamoxifen or toremifine. Tamoxifen ((Z)-2[p[(1,2-diphenyl-1-butenyl)phenoxyl]-N,N-dimethyl amine citrate) is a potent estrogen receptor (ER) antagonist that has been extensively used to treat ER-positive breast cancer. Tamoxifen is a selective estrogen receptor modulator (SERM, indicated to treat women diagnosed with hormone-receptor-positive, early-stage breast cancer after surgery to reduce the risk of recurrence. Tamoxifen also is used to reduce breast cancer risk in women who haven't been diagnosed but are at higher-than-average risk for the disease. However, tamoxifen is not indicated in hormone-receptor-negative breast cancer.

Histone deacetylase inhibitors (HDACi) like valproic acid, sodium butyrate, vorinostat, romidepsinor and trichostatin A (TSA) are known to be effective anticancer agents through epigenetic modulation. Valproic acid (Valproate; VPA) or valpromide (VPM) or sodium valproate or valproate semisodium forms are medications primarily used to treat epilepsy and prevention of seizures.

Prostate apoptosis response-4 (Par-4) is a naturally occurring tumor suppressor protein that is capable of inducing apoptosis. Since membrane GRP78 is overexpressed in most cancer cells but not normal cells, extracellular or secretory Par-4 induces apoptosis by binding to membrane GRP78. Though secretory Par-4 induces apoptosis in cancer cells, its potential in drug-resistant tumors remains to be fully explored.

Certain prior arts disclose certain combination of drugs used for treating cancer. For instance, US 20090048156A1 discloses a method for treating hormone resistant breast cancer comprising administration of HDAC inhibitors and hormone targeted drugs. However, US' 156 fails to disclose the use of such combination for treating malignant gliomas by targeting Par-4-GRP78 pathway.

US 20080085874A1 discloses method of treating estrogen receptor positive breast cancer comprising administration of combination comprising HDAC inhibitor in combination with hormonal therapy wherein the HDAC inhibitor is not valproic acid. However, US' 874 fails to disclose the combination of tamoxifen and valproic acids for treating malignant gliomas.

The above cited prior arts disclose combinations of HDAC inhibitor with hormone targeted drugs in breast cancer. There remains a need for effective novel combination of HDAC inhibitor and hormone targeted drugs having anticancer activity against drug resistant malignant gliomas. Therefore, there is a need to develop new strategies for controlling the cell growth and killing of cancerous cells in high grade gliomas or malignant gliomas.

OBJECT OF THE INVENTION

An object of the invention is to provide a novel, synergistic combination of HDAC inhibitor and estrogen receptor (ER) antagonist having anticancer effects by targeting Par4/GRP78 pathway.

SUMMARY OF THE INVENTION

The present invention is based on synergistic combination comprising histone deacetylase inhibitors (HDACi) in combination with a hormone-targeted drug for treating cancer, in particular for gliomas. More specifically, the present invention pertains to a synergistic combination comprising histone deacetylase inhibitors (HDACi) in combination with estrogen receptor (ER) antagonist for treating gliomas. The histone deacetylase inhibitors (HDACi) may be selected from the group comprising valproic acid or its analogues, sodium butyrate, vorinostat, romidepsinor and trichostatin A (TSA) and estrogen receptor (ER) antagonist may be selected from the group comprising tamoxifen, raloxifene, fulvestrant, and torimefene or a combination thereof for treating gliomas, in particular high grade gliomas or malignant gliomas by targeting the Par-4-GRP78 pathway.

BRIEF DESCRIPTION OF FIGURES

FIG. 1 also depicts the P values (represented as *) significant for differences between TAM alone versus TAM+VPA. The images are LN-18 cells grown as 2D cultures—ML and 3D-MCS.

FIG. 4 depicts the effect of combination of tamoxifen (10 μg/ml) and valproic acid (2 mM) on the levels of secretory Par-4 and expression of GRP78 in LN-229 cells wherein the control (C) represents untreated cells, V represents for valproic acid, T represents for tamoxifen and V+T represents combination of tamoxifen and valproic acid. The LN-18 cells were treated with tamoxifen or valproic acid alone or in combination for 48 hrs.

DETAILED DESCRIPTION OF THE INVENTION

Figure 1:
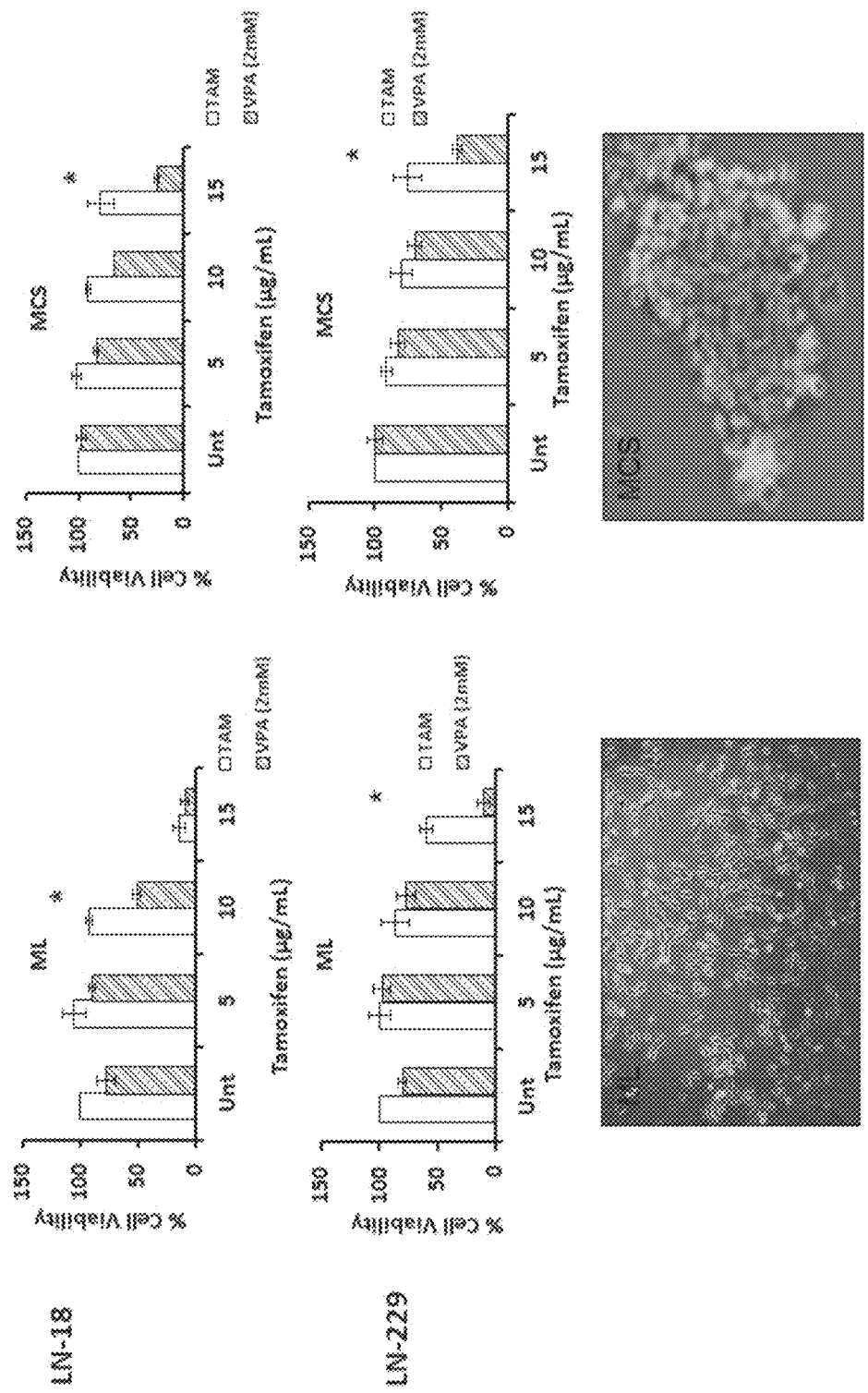
FIG. 1 depicts cell viability assessed by MTT assay in GBM cell lines-LN-18 and LN-229 using tamoxifen (TAM) at concentration of 5 µg/ml, 10 µg/ml and 15 µg/ml; individually and in combination with Valproic Acid (VPA) (2 mM) wherein the cells were cultured as monolayer (ML) or Multicellular Spheroids (MCS). Unt-open bar-represents untreated cells and hatched bar—VPM (2 mM). Further, the open bars (in 5, 10 15) depict TAM alone and the hatched bars depict TAM in combination with VPA.

The present invention is based on synergistic combination comprising histone deacetylase inhibitors (HDACi) in combination with a hormone-targeted drug for treating cancer, in particular for gliomas.

The present invention is capable of being administered to a subject. A "Subject" herein is any mammal, preferably the subject is a human. The subject includes within its scope patients or any diseased mammal or human.

In an embodiment, the present invention is directed towards a combined synergistic combination effect of histone deacetylase inhibitor (HDACi) with estrogen receptor (ER) antagonist. Without being limited to the theory, the novel combination of the present invention induces its anticancer effects through intervention of signal transduction pathway in gliomas. It hence envisages that this combination will also be effective in other pathways, preferably in Par-4/GRP78 pathway.

The synergistic combination may also affect other signal transduction pathways such as RTK/Ras/PI3K signaling pathway, pRB signaling pathway, PI3K/AKT/mTOR pathway, p53 pathway, Par-4/GRP78 pathway individually or in combination thereof as promising targets for killing of cancer cells.

The histone deacetylase inhibitors (HDACi) may be selected from the group comprising valproic acid or its analogues, sodium valproate, valproate semisodium, valpromide, sodium butyrate, vorinostat, romidepsinor and trichostatin A (TSA), preferably valproic acid.

The concentration of valproic acid/valpromide may be used in the range of 0.5 mM to 5 mM, more preferably at 1 mM to 5 mM and most preferably at 1-3 mM.

The estrogen receptor (ER) antagonist may be selected from the group comprising tamoxifen, raloxifene, fulvestrant, and torimefene, preferably tamoxifen.

The concentration of tamoxifen may be used in the range of 1 μg/ml to 20 μg/ml, more preferably at 5 μg/ml to 15 μg/ml and most preferably at 5 μg/ml to 15 μg/ml.

Surprisingly, it has been found that the combination of tamoxifen and valproic acid is synergistic and induce apoptosis in glioma cells in a dose-dependent manner that has been demonstrated in vitro on various brain tumor cell lines such as LN-229, T98G [T98-G], LN-18, M059K, M059J, U-87 MG, U-118 MG, or a combination thereof.

Additional ingredients may be included with the combination of the present invention having anticancer effect on gliomas. Such ingredients may be any actives that may be used for treatment of cancer.

In another embodiment, the present invention discloses a composition comprising the combination of histone deacetylase inhibitor (HDACi) and estrogen receptor (ER) antagonist, along with pharmaceutically acceptable excipients selected from the group comprising preservatives, buffering agents, salts, carriers, diluents.

Such additional ingredients include other active agents, preservatives, buffering agents, salts, carriers, diluents, or other pharmaceutically acceptable ingredients. As mentioned VPM also works though it is not a HDAC inhibitor. The finding suggests that the anti-cancer effect is independent of its activity as HDAC inhibitor.

The present invention discloses a composition comprising the combination, for treating cancer, drug-resistant tumors, cancer stem cells, malignant gliomas or high-grade gliomas by administering a pharmaceutically effective amount to a subject.

In another embodiment, the synergistic combination of the present invention comprising histone deacetylase inhibitor (HDACi), preferably valproic acid or its analogues and estrogen receptor (ER) antagonist, preferably tamoxifen may induce the expression of intrinsic and secretory pro-apoptotic protein Par-4 which further interacts with the cell surface receptor GRP78 (glucose-regulated protein 78) to induce cancer cell apoptosis in a specific manner.

The combination of the present invention is used for treatment of cancer, drug-resistant tumors, cancer stem cells, malignant gliomas or high-grade gliomas.

In another aspect, the present invention discloses a composition comprising the combination of histone deacetylase inhibitors (HDACi) and an estrogen receptor (ER) antagonist, for treating cancer, drug-resistant tumors, cancer stem cells, malignant gliomas or high-grade gliomas by administering a pharmaceutically effective amount to a subject or for its effect in RTK/Ras/PI3K signaling pathway, pRB signaling pathway, PI3K/AKT/mTOR pathway, p53 pathway, Par-4/GRP78, preferably in Par-4/GRP78 pathway.

The histone deacetylase inhibitors (HDACi) is selected from the group comprising valproic acid or its analogues, sodium valproate, valproate semisodium, valpromide, sodium butyrate, vorinostat, romidepsinor and trichostatin A (TSA), preferably valproic acid and is present in the range of 0.5 mM to 5 mM, more preferably at 1 mM to 5 mM and most preferably at 1 to 3 mM.

The estrogen receptor (ER) antagonist is selected from the group comprising tamoxifen, raloxifene, fulvestrant, and torimefene, preferably tamoxifen and is in the range of 1 μg/ml to 20 μg/ml, more preferably at 5 μg/ml to 15 μg/ml and most preferably at 5 μg/ml to 15 μg/ml.

In another aspect the present invention discloses a method of treating cancer, drug-resistant tumors or cancer stem cells, malignant gliomas or highgrade gliomas, said method comprising administering to a patient a combination comprising histone deacetylase inhibitors (HDACi) and an estrogen receptor (ER) antagonist in pharmaceutically effective amount.

The histone deacetylase inhibitors (HDACi) of the said method of treatment is selected from the group comprising valproic acid or its analogues, sodium valproate, valproate semisodium, valpromide, sodium butyrate, vorinostat, romidepsinor and trichostatin A (TSA), preferably valproic acid. The histone deacetylase inhibitors (HDACi) is in the range of 0.5 mM to 5 mM, more preferably at 1 mM to 5 mM and most preferably at 1 to 3 mM.

The estrogen receptor (ER) antagonist of the said method of treatment is selected from the group comprising tamoxifen, raloxifene, fulvestrant, and torimefene, preferably tamoxifen. The estrogen receptor (ER) antagonist is in the range of 1 μg/ml to 20 μg/ml, more preferably at 5 μg/ml to 15 μg/ml and most preferably at 5 μg/ml to 15 μg/ml.

The present invention also discloses a method of intervening in RTK/Ras/PI3K signaling pathway, pRB signaling pathway, PI3K/AKT/mTOR pathway, p53 pathway, Par-4/GRP78, preferably in Par-4/GRP78 pathway by administration of the combination of the present invention.

Advantages

1. The synergistic combination of the present invention having anticancer effects is effective against malignant gliomas or high-grade gliomas.
2. The synergistic combination of the present invention may effectively act against drug-resistant tumors or cancer stem cells.
3. The combination of tamoxifen and valproic acid may induce apoptosis in cancer cells by targeting specific Par-4/GRP78 pathway, which is unexpected.

EXAMPLES

The following examples are given by the way of illustration of the present invention and therefore should not be construed to limit the scope of the present invention.

Example 1: Effect of Tamoxifen (TAM) and VPA in LN-18 Cells and LN229 Cells

MTT assay was employed for assessing the combined action of tamoxifen (TAM) and VPA. LN-18 cells and LN-229 were seeded in 96 well plate (5000 cells/100 ul/well) in complete medium and cultured for 24 hr in two culture models-monolayer and 3D culture. Cells were treated with tamoxifen (TAM) at 3 concentrations-5 μg/ml, 10 μg/ml and 15 μg/ml either individually or in combination with Valproic Acid (VPA) (2 mM) for 24 hr. MTT was added and after 4 hr the crystals were solubilized using DMSO. Absorbance was recorded at 490 nm (test filter) and 570 nm (reference filter). The % cell viability in treated cells was calculated considering the readings in untreated cells as 100%. The results are presented at FIG. 1. From FIG. 1 it is evident that the effect of TAM was dose dependent in monolayer, TAM was toxic at 15 ug/ml in LN-18 cells. More importantly it can be seen that VPA enhanced the effect of TAM (10 ug/ml) significantly in LN-18 cells cultured as monolayer culture and that MCS of LN-18 cells were resistant to TAM treatment. Furthermore, VPA enhanced the effect of TAM at 10 ug/ml in ML and at 15 ug/ml in MCS of LN-18 cells. MCS of LN 229 cells were resistant to TAM treatment and VPA enhanced the effect significantly in cells treated with TAM at 15 ug/ml. From FIG. 1, it is evident that the combination of the present invention is synergistic.

Figure 2:
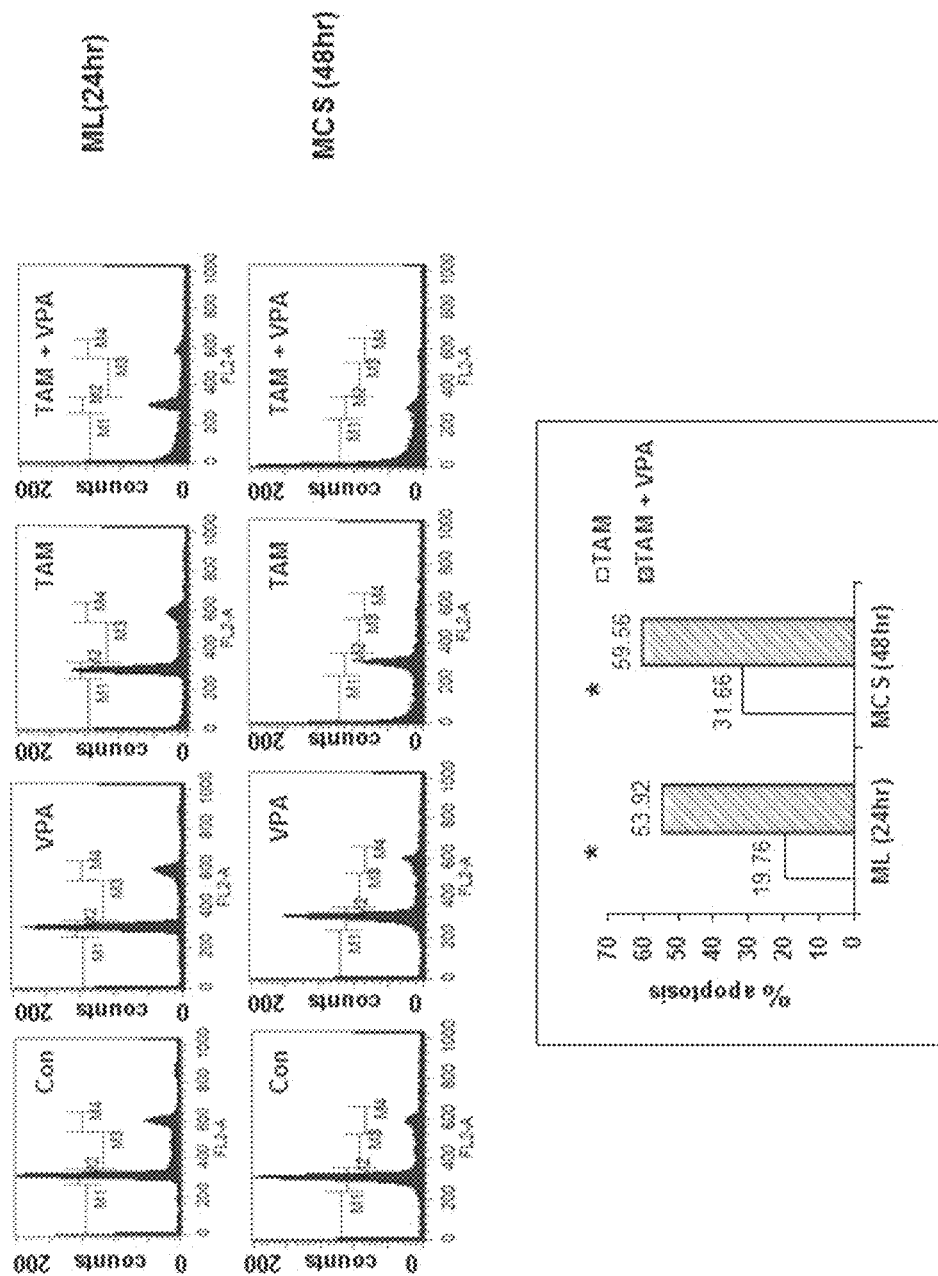
FIG. 2 depicts the effect of Valproic acid (VPA) on tamoxifen (TAM)-induced apoptosis in LN-18 cells cultured as monolayer (ML) or Multicellular Spheroids (MCS). The cells cultured as monolayers were treated with tamoxifen (10 ug/ml) or valproic acid (2 mM) alone or in combination for 24 hrs (upper panel), and the LN-229 cells cultured as multicellular spheroids were treated with tamoxifen (10 ug/ml) or valproic acid (2 mM) alone or in combination for 48 hrs (Lower panel). The P values (represented as *) are significant for differences between TAM alone versus TAM+VPA.

Example 2: Effect of VPA on Induction of Apoptosis with of Tamoxifen (TAM) in LN-18 Cells LN-18 cells were seeded in 6 well plate (0.25 million cells/well) in complete medium and grown as 2D (monolayer) or 3D (MCS) cultures. Cells were treated with tamoxifen (TAM)-10 μg/ml either individually or in combination with Valproic Acid (VPA) (2 mM). Monolayer were treated for 24 hr and MCS were treated for 48 hr. Cells were fixed and stained with propidium Iodide and analysed by flow-cytometry for cell cycle analysis. Data was acquired for 20,000 cells on linear scale (FL2A) and the cell population in pre-G0/G1 phase representing the apoptotic population was measured. The results are presented at FIG. 2. From FIG. 2, it can be seen that VPA enhanced the apopotic effect of TAM (10 ug/ml) significantly in monolayer culture of LN-18 cells treated for 24 hr. VPA enhanced the apopotic effect of TAM (10 ug/ml) significantly in MCS culture of LN-18 cells treated for 48 hr. In FIG. 2, the synergistic effect of the present invention being the effect of apoptosis. Statistically significant difference is observed between apoptosis induced by TAM alone Vs. TAM+VPA is clearly seen.

Example 3: Comparison of VPA and VPM in Combined Action with Tamoxifen (TAM)

Figure 3:
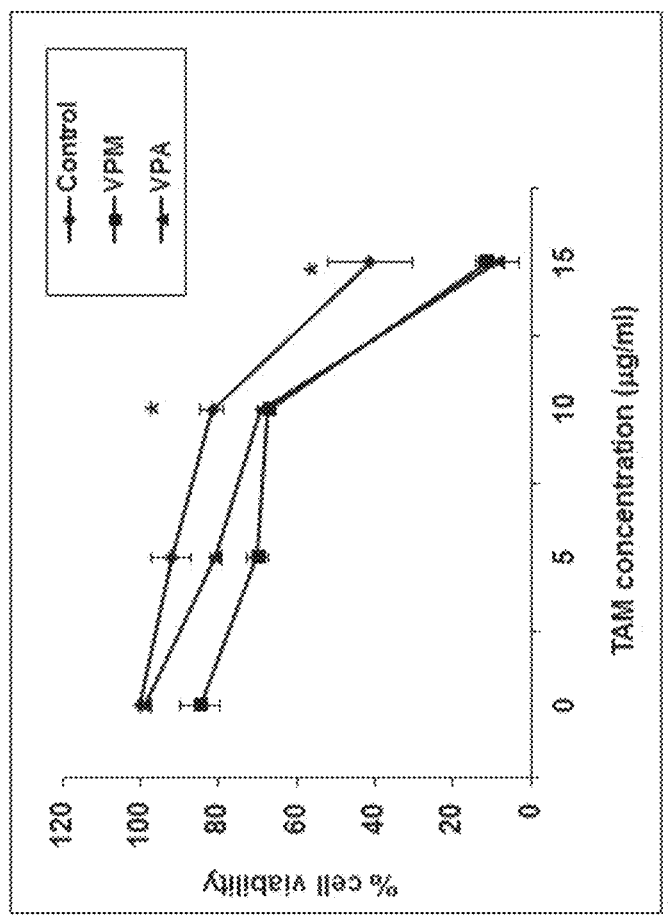
FIG. 3 depicts the effect of Valpromide (VPM), an analogue of VPA causing sensitization of tamoxifen (TAM) which induced cell death in LN-18 cells cultured as monolayer (ML). The figure depicts that VPA and VPM show similar responses in combination with TAM in reducing cell viability in LN-18 cells. The P values (represented as *) are significant for differences between TAM alone versus TAM+VPA/VPM.

LN-18 cells (ML) were seeded in 96 well plate (5000 cells/100 ul/well) in complete medium and cultured for 24 hr. Cells were treated with tamoxifen (TAM) at 10 μg/ml either individually or in combination with Valproic Acid (VPA) (2 mM) or VPM (2 mM) for 24 hr. MTT was added and after 4 hr the crystals were solubilized using DMSO. Absorbance was recorded at 490 nm (test filter) and 570 nm (reference filter). The % cell viability with treatment was calculated with readings in untreated cells considered as 100%. The results are presented at FIG. 3. It can be seen from FIG. 3 that there was no significant difference in the effect induced by VPA and VPM in combination with TAM (10 ug/ml and 15 ug/ml) on cell viability in LN-18 cells treated for 24 hr.

Example 4: Evaluation of Expression of Intracellular and Secretory Prostate Apoptosis Response (Par)-4 in LN-18 Cells LN-18 cells were seeded in 6 well plate (0.3 million cells/well) and treated with TAM (10 μg/ml) and VPA (2 mM) either individually or in combination for 48 hr. Cell lysates were assessed for expression of intracellular prostate apoptosis response (Par)-4 and secretory Par-4 was measured in supernatants. Western blotting was done using 10% gels and the proteins were identified using specific antibodies followed by probing with luminol-based Enhanced Chemiluminescent (ECL) western blotting substrate. The results are presented at FIG. 4. From FIG. 4, it can be seen that both cellular and secretory Par-4 was enhanced with TAM and a combination of TAM and VPA further enhanced the level indicating a synergistic effect.

Figure 5:
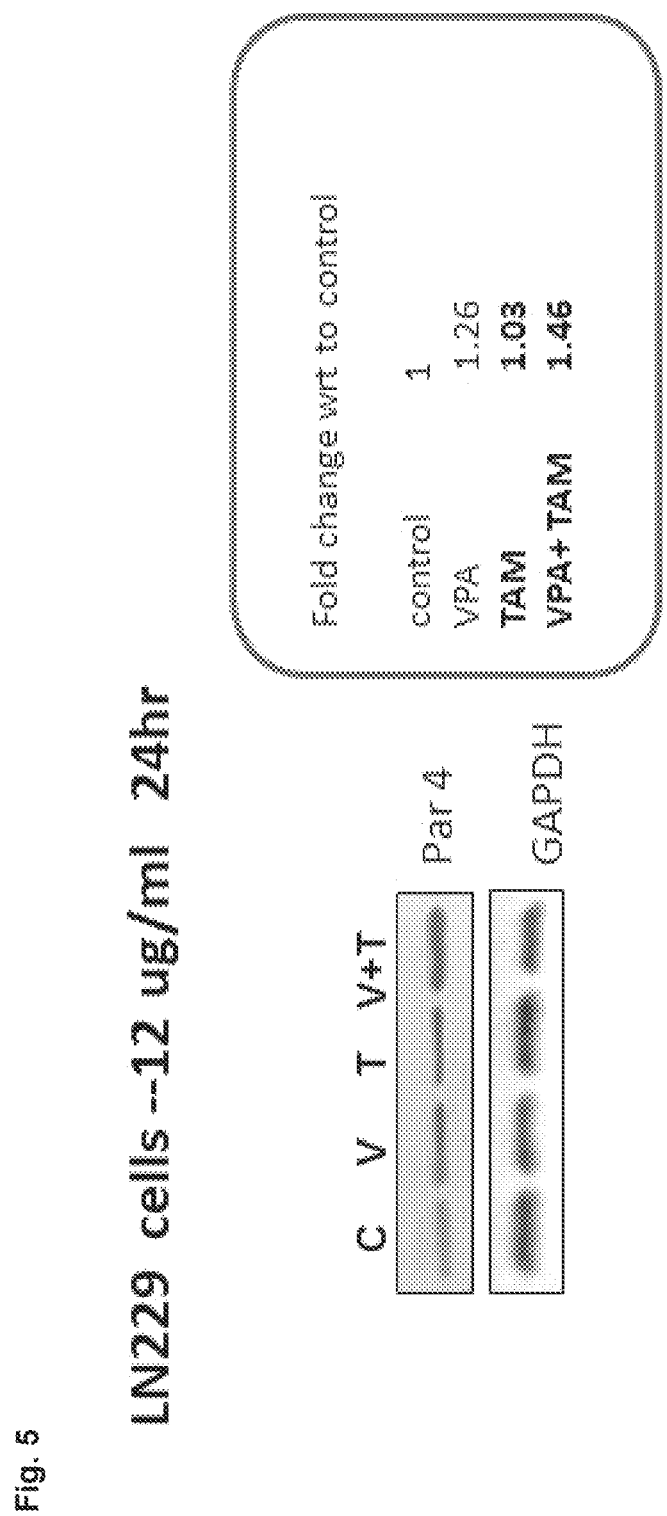
FIG. 5 depicts the effect of tamoxifen (12 μg/ml) or valproic acid (2 mM) alone or combination of tamoxifen and valproic acid on Par-4 expression in LN-229 cells for 24 hr. GAPDH was used as loading control and control group (C) represents untreated cells.

Example 5: Evaluation of Expression of Intracellular Prostate Apoptosis Response (Par)-4 in LN-229 Cells LN-229 cells were seeded in 6 well plate (0.3 million cells/well) and treated with TAM (12 μg/ml) and VPA (2 mM) either individually or in combination for 24 hr. Cell lysates were assessed for expression of intracellular prostate apoptosis response (Par)-4. Western blotting was done using 10% gels and the proteins were identified using specific antibodies followed by probing with luminol-based Enhanced Chemiluminescent (ECL) western blotting substrate. The results are presented at FIG. 5. From FIG. 5, the VPA induced cellular Par-4 expression at 24 hr may be seen. The combined effect of TAM and VPA was higher compared to TAM alone clearly demonstrating synergy.

The invention claimed is:

1. A pharmaceutical composition comprising valpromide, tamoxifen, and a pharmaceutically acceptable excipient, wherein valpromide is present in a range of 0.5 mM to 5 mM and tamoxifen is present in a range of 1 μg/ml to 20 μg/ml.

2. The pharmaceutical composition according to claim 1, wherein valpromide is present in a range of 1 mM to 5 mM.

3. The pharmaceutical composition according to claim 2, wherein valpromide is present in a range of 1 to 3 mM.

4. The pharmaceutical composition according to claim 1, wherein tamoxifen is present in a range of 5 μg/ml to 15 μg/ml.

5. The pharmaceutical composition according to claim 1, wherein the pharmaceutically acceptable excipient is selected from the group consisting of a preservative, a buffering agent, a salt, a carrier, a diluent, and any combination thereof.

6. A method treating a patient suffering from glioma, the method comprising administering to the patient an effective amount of the pharmaceutical composition of claim 1.

7. The method according to claim 6, wherein the glioma is malignant glioma or high-grade glioma.

* * * * *